(12) United States Patent
Kocinec et al.

(10) Patent No.: US 6,645,887 B2
(45) Date of Patent: Nov. 11, 2003

(54) DURABLE WATERPROOF BREATHABLE LAMINATE

(75) Inventors: James A. Kocinec, Forest, VA (US); Richard C Jefferson, Gretna, VA (US)

(73) Assignee: Burlington Industries, Inc., Greensboro, NC (US)

(*) Notice: Subject to any disclaimer, the term of this patent is extended or adjusted under 35 U.S.C. 154(b) by 123 days.

(21) Appl. No.: 09/858,903

(22) Filed: May 17, 2001

(65) Prior Publication Data
US 2002/0173211 A1 Nov. 21, 2002

(51) Int. Cl.$^7$ .............................................. B32B 27/04
(52) U.S. Cl. ..................... 442/149; 442/268; 442/277; 442/286; 442/290; 442/291; 442/301; 442/304; 442/319; 442/327; 442/381; 442/394; 442/398; 428/195; 428/198
(58) Field of Search ................................ 442/149, 268, 442/277, 286, 290, 291, 301, 304, 319, 327, 381, 394, 398; 428/195, 198

(56) References Cited
U.S. PATENT DOCUMENTS

| | | | | |
|---|---|---|---|---|
| 4,539,255 A | * | 9/1985 | Sato et al. ................... | 442/286 |
| 4,761,324 A | * | 8/1988 | Rautenberg et al. ......... | 428/198 |
| 4,847,142 A | * | 7/1989 | Twilley et al. ............... | 442/291 |
| 5,521,273 A | * | 5/1996 | Yilgor et al. .................. | 528/66 |
| 5,660,918 A | * | 8/1997 | Dutta .......................... | 428/196 |
| 5,981,020 A | * | 11/1999 | Sutherland et al. ........... | 428/85 |

\* cited by examiner

Primary Examiner—Elizabeth M. Cole
Assistant Examiner—Norca L. Torres
(74) Attorney, Agent, or Firm—Nixon & Vanderhye P.C.

(57) ABSTRACT

A durable, water-resistant, breathable, multi-layer laminate adapted to transmit moisture and composed of (1) an outer woven, non-woven or knitted layer of fabric, (2) a discontinuous non-breathable hydrophobic adhesive, (3) a first hydrophilic barrier film adhesively secured to the outer fabric layer, by the hydrophilic adhesive, (4) a continuous film or discontinuous breathable hydrophilic adhesive, and (5) a second hydrophilic barrier film adhered to the hydrophilic adhesive. The first hydrophilic barrier film and second hydrophilic barrier film are adhesively secured to each other with the breathable hydrophilic adhesive and define a void area between the two films and together the films enhance moisture migration and transfer. The laminates may include two additional layers of (6) a second hydrophilic adhesive, and (7) a fabric backing layer secured by the second hydrophilic adhesive.

10 Claims, 1 Drawing Sheet

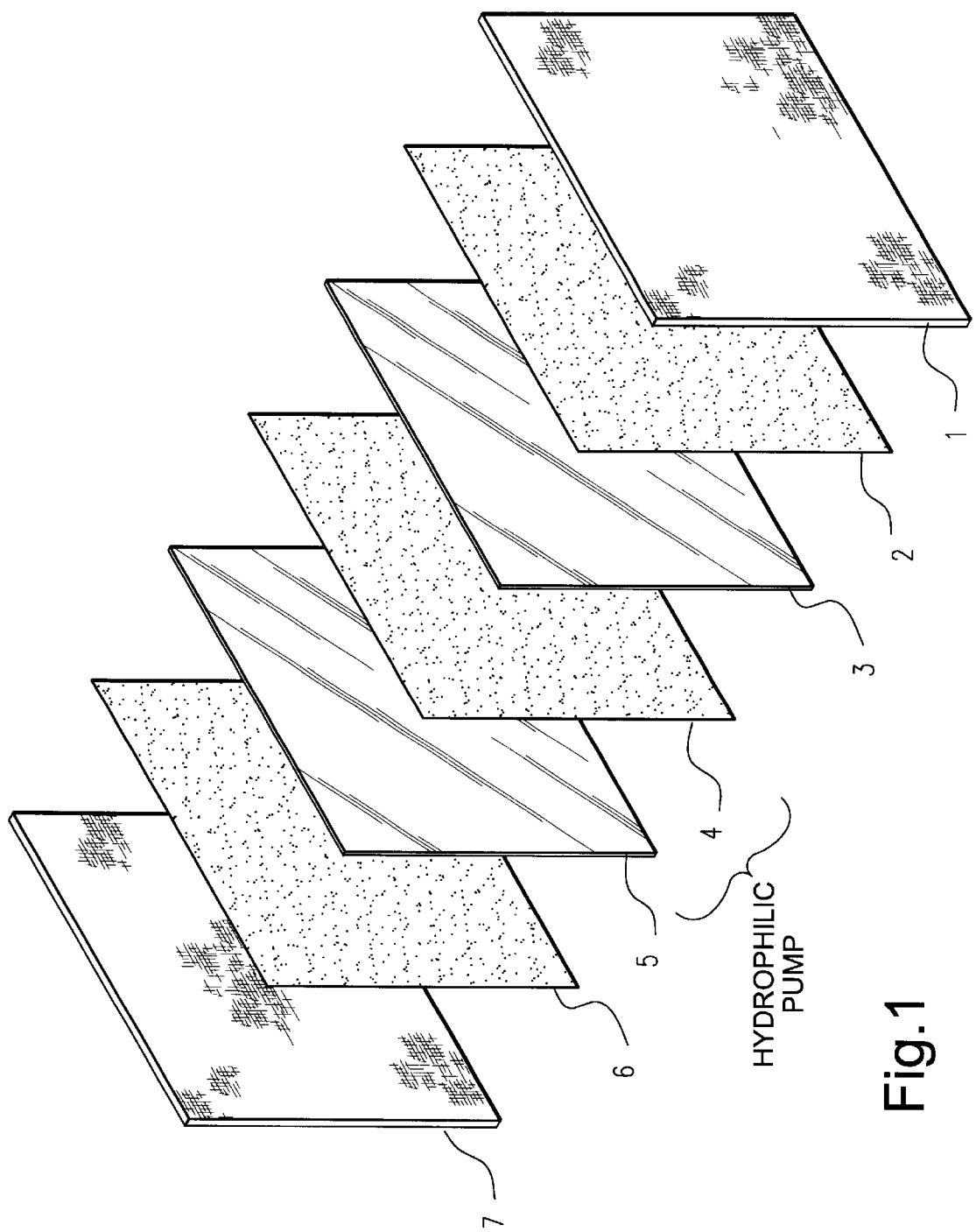

DURABLE WATERPROOF BREATHABLE LAMINATE

This invention relates to a water resistant yet breathable multi-layer film and fabric containing laminate or construction, including multiple hydrophilic layers, that is durable and able to withstand a wide range of use conditions. These laminates are designed for constructing activewear garments such as running and cycling.

BACKGROUND OF THE INVENTION

In recent years, hydrophilic films have come to represent performance in the water-resistant "breathables" market. However, the use of hydrophobic adhesives, necessary to gain wash durability, has limited the performance of standard hydrophilic laminates in terms of breathability. The disclosed multi-ply hydrophilic technology, incorporating a shielded hydrophilic adhesive, provides a means to increase the water vapor transmission performance ceiling and create an array of new products. Significantly enhanced performance levels will allow lower cost inventive laminates to compete with existing higher cost materials.

In prior procedures, laminations to fabric of both hydrophilic and hydrophobic microporous films have typically relied on hydrophobic adhesives to attain the durability to laundering needed in breathable fabrics. Single film laminates frequently develop pinholes reducing the integrity and performance of the microporous film. Hydrophilic adhesives lacked suitable durability when exposed to wash conditions primarily because they would inherently swell when exposed to water and the fact that they were typically attached to substrates with limited stretch. Typical arrangements also limited constructions to single film laminates because it was thought the use of additional film layers would reduce the overall breathability of the product. The use of hydrophobic adhesives to join multiple layers of films indeed reduced the overall breathability of the finished laminate even if both films were hydrophilic.

The use of non-breathable adhesives in conjunction with hydrophilic films is described in U.S. Pat. Nos. 5,660,918 and 4,761,324. It has now been determined that the use of hydrophilic adhesives in the laminate to join an additional layer of hydrophilic film resulting in a pair of hydrophilic films separated/adhered to each other by a hydrophilic adhesive can result in an increase in overall breathability of the laminate and this is the basis for the present invention.

BRIEF DESCRIPTION OF THE DRAWING

FIG. 1 is a perspective spaced apart view of a durable, water-resistant, breathable multi-layer laminate of the invention.

DESCRIPTION OF THE INVENTION

Described is a durable, water-resistant, breathable, multi-layer laminate adapted to transmit moisture, the laminate being composed of (1) an outer woven, non-woven or knitted layer face fabric, (2) a discontinuous non-breathable hydrophobic adhesive, (3) a first hydrophilic barrier film adhesively secured to the outer fabric layer, by the hydrophobic adhesive, (4) a continuous film or discontinuous breathable hydrophilic adhesive, and (5) a second hydrophilic film adhered to the hydrophilic adhesive wherein the first hydrophilic barrier film and second hydrophilic barrier film are adhesively secured to each other with a breathable hydrophilic adhesive and define a void area between the two films and together the films enhance moisture migration and transfer. The laminates may also include two additional layers of (6) a second hydrophilic adhesive, and (7) a fabric backing layer or liner such as nylon or polyester tricot secured by the second hydrophilic adhesive. Preferably both the first and second hydrophilic barrier films are nylon/polyethylene blended films, and the outer fabric layer (1) is woven fabric. The discontinuous hydrophobic adhesive (2) may be a hot melt adhesive. Desirably, the hydrophilic barrier films (3) and (5) have an inverted breathability of 5,000 to 11,000 g./m2/24 hr. as tested per ASTM E96 and the second hydrophilic film is a urethane, polyamide or nylon.

The multi-layer laminate of the invention provides laminations of superior breathability. It also allows the adjustment and increase of other properties through judicial selection of films, without automatic subsequent loss of breathability. This multi-layer film construction widens the performance window for engineering new breathable composites. In one particularly advantageous embodiment, it allows the substitution of a low cost nylon/urethane blended film for PTFE in the construction of a chemically resistant laminate. The lower cost product is surprisingly superior in terms of breathability, mullen performance and is pinhole free, a frequent complaint with single film laminates.

This invention provides an all hydrophilic film-to-fabric laminate which incorporates a multi-layer film construction. A typical laminate known in this art is made of a single film construction because standard adhesive lamination of a second film would result in lower breathability performance. This invention forwards the concept that an all-hydrophilic multi-film construction can actually enhance performance when assembled with a hydrophilic adhesive layer. The first layer of such a laminate is prepared in the same manner as a typical two ply laminate. Hot melt hydrophobic adhesive is applied in a discontinuous dot matrix pattern to fabric or film and the two components (fabric and film) are nipped together and allowed to cure. A second, hydrophilic adhesive is then applied to the laminate in a dot matrix pattern to the film side of the laminate. This adhesive can be either solvent-based, water-based or hot melt. A second hydrophilic film is then attached creating a two-film layer composite laminated to a fabric layer. Breathability is improved because initial moisture migration is not hindered by either a hydrophobic adhesive or a non-controlled environment, as it would be in a typical two ply laminate.

In the multi-ply hydrophilic film-to-fabric laminate, the hydrophilic adhesive serves to reduce the phase transition requirements of moisture transgressing through the laminate and increases the surface area through which moisture transfer can occur. In addition, the void area between the films directly interfaces with the first hydrophilic film which functions as a sponging agent keeping the air void receptive to moisture regain. This mechanism, which is referred to as a "hydrophilic pump," functions primarily because of the increased differential on the outward most or first (face) film caused by the other hydrophilic layers. The present invention combines the use of hydrophilic films, durable adhesives and breathable hydrophilic adhesives to create a symbiotic performance advantage. This allows the construction of unique textile laminates for use in outdoor garments and other textile applications. Although the first layer of film is applied as in a typical laminate, through the use of a hydrophobic non-breathable adhesive, the second film is attached with a hydrophilic adhesive (at 4 to 12 gm/sq. meter). Placing the hydrophilic adhesive between two layers of film offers some measure of protection from attack during wash exposure. It also receives protection because it is placed between similarly expansive materials, so it does not experience the shear degradation it would be subjected to if applied to a non-stretch material. This construction therefore allows the creation of a durable laminate.

The performance advantage seen is a rise in water vapor transmission rates above that of the single film laminate using the same materials. If a two ply laminate was constructed with an intermediate layer of hydrophobic adhesive, despite the added hydrophilic mass, the hydrophobic adhesive becomes the controlling layer and lowered WVT performance results. With the use of the hydrophilic adhesive as described herein, the surface area over which moisture can transfer from the second film increases and this assists in improving the moisture transfer rate. The breathable laminates of this invention are particularly suited to activeware garments especially where activity produces high levels of perspiration such as running and cycling. Constructions of the present invention have achieved inverted breathability values in excess of 10,000 gm/sq.m/24 hr and sometime in excess of 12,000 gm/sq.m/24 hr breathability.

Although the precise mechanism of the invention is at present uncertain, it is believed that the water vapor transmission rate is assisted by several mechanisms. First, although it would normally be offset by reduced adhesive breathability if a hydrophobic adhesive system was used, the fact that there is more hydrophilic mass in terms of film to pick up water from the surrounding atmosphere enhances the breathability performance. Second, the void area created between the films accelerates the rate of moisture pick up and transfer through the second film because it is an area which has a lower than normal moisture content during the initial phase of moisture gain. Next, as the intermediate layer begins to reach saturation the transfer of moisture into the solid phase of the first film is aided by the fact that water vapor rather than liquid state moisture is available in the slightly pressurized void areas for pick up. This accelerates the rate of gain by the first film. Finally, the hydrophilic adhesive also assists the moisture gain. Moisture from the adhesive is transferred at a higher rate because it does not have to transition through a phase change or surface barrier.

The combined effects of increased hydrophilic mass, increased differential over the first film, pressurized water vapor in the void area and reduced phase transition help to create a "hydrophilic pump" which allows one to increase breathability or to maintain breathability while taking advantage of other combined performance virtues of differing hydrophilic films.

BEST MODE FOR CARRYING OUT THE INVENTION

The invention is further explained with reference to the attached drawing. The laminate structure of FIG. 1, which is basic to the "hydrophilic pump," consists of five layers.

First is the outer shell fabric (1) which is selected from a wide variety of different fabrics, knit, woven or in some circumstances even non-woven products. Although primarily the weight of the fabric will fall between 0.7 and 2.5 oz./sq. yard. for performance reasons, it is possible that the weight could range as high as 10 oz./sq. yd. The weight will depend on the particular use for which the multi-layer laminate is intended, and the fabric construction.

Second is a layer of hydrophobic adhesive (2). It is used to adhere the outer shell fabric (1) to the first layer of hydrophilic film (3). To achieve maximum breathability of the laminate it is preferable to apply this adhesive in a discontinuous pattern, two examples being either dot matrix or helical. Although this adhesive layer could be either solvent based or hot melt, it is preferred that the adhesive is of the moisture cure hot melt variety, where final cure is achieved at room temperature. An example of this type of adhesive is H. B. Fuller's 2136 adhesive. Typical weight range of deposition would be about 6 to about 15 gm./sq.m. dry.

The third layer is the first hydrophilic-barrier film layer of the hydrophilic sandwich. Typical inverted breathabilities of this film layer range between about 5000 to about 1,000 gm./sq.m./24 hr. as tested per ASTM E96. This layer is typically a urethane film for activewear uses, however for more aggressive environmental conditions where resistance to contacted chemical agents is likely, nylon or polyamides may be used blended with other resins such as the urethanes to modify for hand. One particular advantageous embodiment of the hydrophilic pump technology is in the construction of a laminate for military use, which requires resistance to DEET, a commonly used insect repellent/insecticide. There are several hydrophilic films available which are resistant to DEET. Examples include polyamide-based films, e.g., Bemis 1239 and nylon based films, e.g., Deerfield's 3050. None of these films when applied to fabric achieve DEET required breathability specifications. They are also deficient in mullen performance, occasionally exhibiting pinhole structural defects. Adding a second hydrophilic film to the laminate construction remedies these shortcomings. Vapor transmission rate is improved as is mullen performance and the likelihood of pinhole occurrence. As an alternative embodiment, instead of a freestanding or separate film the first hydrophilic layer may take the form of a coating applied directly to the outer shell fabric (1).

The fourth layer is a hydrophilic adhesive layer (4). This layer is preferably applied in a discontinuous pattern to produce the highest possible performance in terms of WVT and softness. It can, however, also function adequately, applied as a low weight continuous film. Deposition levels of about 0.2 to about 0.5 oz./sq. yd. are preferred with an adhesive such as Bayer's VP LS 2329, an anionic aromatic, polyester-polyether-polyurethane prepolymer dispersion with Butanonoxim blocked NCO-groups. It is catalyzed with a diamine catalyst with an alkylamine concentration of 100% similar to Imprafix VP LS 2330. Because this system contains a blocked catalyst it can be dried first and then laminated to a second substrate. It possesses a fairly high tack and once cured, it will easily withstand repeated washings. As described herein, an adhesive can be regarded as "hydrophilic" if a three mil film of cured adhesive exceeds inverted WVT performance of about 800 gm./sq. m./24 hr.

The fifth layer is the second half of the "hydrophilic pump." It is another hydrophilic film 5 from about 0.5 to about 1.5 mils thick and again inverted E-96 performance of about 5,000 to about 11,000 gm./sq.m./24 hr. Although the primary function for this film is to boost the water vapor transmission rate, proper selection can also effect other performance properties as well. It is therefore critical in laminate design that the performance of the initial laminate be considered in light of the desired end use or product performance specification. Typical hydrophilic films include urethanes, polyamides and nylons as well as polymer blends which can be used to compliment each other. For example, Bemis S1 is particularly advantageous in boosting upright breathability, but it has no DEET resistance. A DEET resistant film, 3050 from Deerfield, when laminated has an upright breathability of under 600 g./sq.m./24 hr. When the S1 film is combined with the 3050 film the sandwich construction passes product performance specifications with an upright breathability of about 800 g./sq.m./24 hr. Likewise with inverted breathability, the laminated 3050 film by itself has an inverted breathability of about 3000 g./sq.m./24 hr. When S1 is added to the construction, inverted breathability of the "pump" composite jumps to about 5000 to about 8000 g./sq.m./24 hr. This exceeds the military specification of 3600 g./sq.m./24 hr. The "pump" laminate passes DEET resistance as well. Unsupported DEET mullen performance goes from about 40 psi up to about 80 psi.

The final two illustrated layers represent the optional use of a backing material 7 such as a tricot knit to aid in slip and abrasion resistance when required. The hydrophilic adhesives 6 applied in a dot matrix pattern have proven themselves successful in adhering nylon and polyester based tricot knit materials to a variety of hydrophilic films used as the second part of the "pump" construction. In a particularly advantageous embodiment the thermoplastic nature of the second hydrophilic film 5 is used to fuse it to the backing material, thereby eliminating an adhesive layer 6.

In FIG. 1, the adhesives 2, 4 and 6 are depicted as discrete layers, for purposes of illustration and explanation. In practice, the adhesive is applied to one of the two surfaces to be joined, fabric and/or film, and attached to adjacent film or fabric surface, as the case may be, by pressing, such as by passage through the nip between two rolls.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A durable, water-resistant, breathable, multi-layer laminate adapted to transmit moisture comprising:
   (1) an outer woven, non-woven or knitted layer of fabric,
   (2) a layer of a discontinuous non-breathable hydrophobic adhesive applied to the outer layer,
   (3) a first hydrophilic barrier film adhesively secured to the outer fabric layer, by the hydrophobic adhesive,
   (4) a continuous film or discontinuous layer of a breathable hydrophilic adhesive, and
   (5) a second hydrophilic barrier film adhered to the continuous film or discontinuous layer of hydrophilic adhesive
      wherein the first hydrophilic barrier film and second hydrophilic barrier film are adhesively secured to each other with the breathable hydrophilic adhesive and define a void area between the two films enhancing moisture migration and transfer.

2. A durable, water-resistant, breathable, multi-layer laminate adapted to transmit moisture comprising:
   (1) an outer woven, non-woven or knitted layer of fabric,
   (2) a layer of a discontinuous non-breathable hydrophobic adhesive applied to the outer layer,
   (3) a first hydrophilic barrier film adhesively secured to the outer fabric layer, by a hydrophobic adhesive,
   (4) a continuous film or discontinuous layer of a breathable hydrophilic adhesive, and
   (5) a second hydrophilic barrier film adhered to the continuous film or discontinuous layer of hydrophilic adhesive,
   (6) a second hydrophilic adhesive, and
   (7) a fabric backing layer, the second hydrophilic adhesive securing the second hydrophilic film to the fabric backing,
      wherein the first hydrophilic barrier film and second hydrophilic barrier film are adhesively secured to each other with the breathable hydrophilic adhesive and define a void area between the two films and together the films enhance moisture migration and transfer.

3. The laminate of claim 1 wherein both the first and second hydrophilic barrier films are nylon/polyethylene blended films.

4. The laminate of claim 1 or 2 wherein the outer fabric layer (1) is non-woven.

5. The laminate of claim 1 or 2 wherein the discontinuous hydrophobic adhesive (2) is a hot melt adhesive.

6. The laminate of claim 1 or 2 wherein the first hydrophilic barrier film (3) has an inverted breathability of about 5,000 to about 11,000 g./m$^2$/24 hr, as tested per ASTM E96.

7. The laminate of claim 1 or 2 wherein the hydrophilic adhesive (4) is applied in a discontinuous manner.

8. The laminate of claim 1 or 2 wherein the second hydrophilic film is a urethane, polyamide or nylon.

9. The laminate of claim 1 or 2 wherein second hydrophilic film (5) is a barrier layer that has an inverted breathability of about 5,000 to about 11,000 g./m$^2$/24 hr, as tested per ASTM E96.

10. The laminate of claim 2 wherein the fabric of layer (7) is a tricot knit.

* * * * *